UNITED STATES PATENT OFFICE.

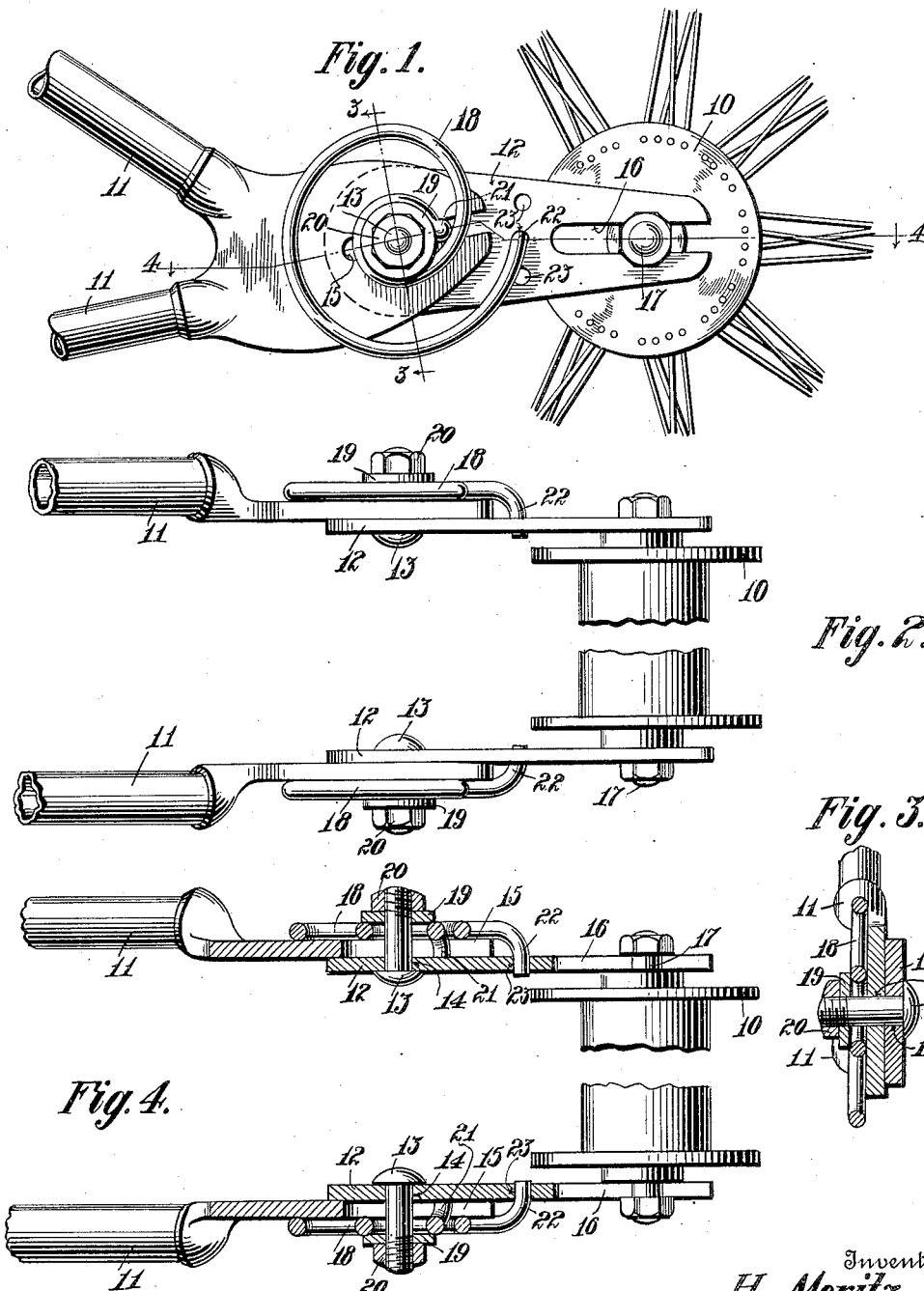

HERMAN MORITZ, JOSEPH J. KOELSCH, AND FRANK T. KOEHN, OF DURHAM, KANSAS.

SHOCK-ABSORBER ATTACHMENT.

1,057,573.

Specification of Letters Patent.

Patented Apr. 1, 1913.

Application filed May 3, 1912. Serial No. 694,919.

*To all whom it may concern:*

Be it known that we, HERMAN MORITZ, JOSEPH J. KOELSCH, and FRANK T. KOEHN, citizens of the United States, residing at Durham, in the county of Marion, State of Kansas, have invented certain new and useful Improvements in Shock-Absorber Attachments; and we do hereby declare the following to be a full, clear, and exact description of the invention, such as will enable others skilled in the art to which it appertains to make and use the same.

This invention relates to shock absorbers for motorcycles and has for an object to provide an extremely compact and simple device that may be attached to most of the motorcycle frames now in general use without alterations to the frames.

With the above object in view the invention consists of certain novel details of construction and combination of parts hereinafter fully described and claimed, it being understood that various modifications may be made in the minor details of construction within the scope of the appended claim.

In the accompanying drawing forming part of this specification:—Figure 1 is a side elevation of the device applied. Fig. 2 is a plan view of the device applied. Fig. 3 is a vertical sectional view taken on the line 3—3 Fig. 1. Fig. 4 is a horizontal sectional view taken on the line 4—4 Fig. 1.

Referring now to the drawing in which like characters of reference designate similar parts, 10 designates the rear or driving wheel, and 11 the rear wheel supporting forks of the motorcycle, it being understood that the above construction is common in bicycles as well as motorcycles and that the shock absorber comprising the subject-matter of this invention is applicable to both bicycles and motorcycles.

The shock absorber comprises two similar plates 12, a bolt 13 being passed through bearings 14 formed in the plates and through the axle receiving slots 15 of the bicycle frame, to secure the plates to the frame, both plates extending rearwardly from the frame as shown. Both plates are provided with slots 16 at the rear ends to receive the wheel axle 17.

Spiral springs 18 are arranged on the outer sides of the frame, the inner convolution of each spring being directed about the bolt 13 and being clamped to the frame through the instrumentality of a washer 19 and nut 20 carried on the related end of the bolt. The said inner convolution terminates in a laterally directed end 21 which fits in the axle receiving slots 15 of the frame. The end of the outermost convolution of each spring is directed laterally on the same side of the spring as the end of the innermost convolution as shown at 22, and this end 22 is selectively engageable in a series of openings 23 formed in the related plate 12. The plates 12 may thus rock vertically at the rear ends when the wheel passes over obstructions, the springs storing up energy during this rocking movement of the plates to return the plates to initial position after the wheel passes beyond the obstruction. By engaging the terminals of the outer convolutions of the springs in any particular openings of the series the tension of the spring may be varied whereby to limit yielding movement upwardly of the plates.

What is claimed, is:—

A shock absorber comprising in combination with a wheel supporting fork having alined slots therein, spaced plates, bearings in the forward ends of said plates, a pivot pin passed through said bearings and terminally secured in said slots, spaced spiral springs having their innermost convolutions directed about the terminals of said pin and thence bent laterally and engaged in said slots, the outermost convolutions of said springs being terminally bent laterally and being adapted to be engaged in openings formed in said plates, and means at the rear ends of said plates for securing a ground wheel.

In testimony whereof, we affix our signatures in presence of two witnesses.

HERMAN MORITZ.
JOSEPH J. KOELSCH.
FRANK T. KOEHN.

Witnesses:
GUSTAV OSWALD,
EMIL T. KOEHN.

Copies of this patent may be obtained for five cents each, by addressing the "Commissioner of Patents, Washington, D. C."